US006687742B1

(12) United States Patent
Iwazaki

(10) Patent No.: US 6,687,742 B1
(45) Date of Patent: Feb. 3, 2004

(54) COMMUNICATION CONTROL METHOD FOR ELECTRONIC MAIL SYSTEM

(75) Inventor: Ryuji Iwazaki, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 640 days.

(21) Appl. No.: 09/584,442

(22) Filed: May 31, 2000

(30) Foreign Application Priority Data

Jun. 3, 1999 (JP) ............................................ 11-156481
Jul. 28, 1999 (JP) ............................................ 11-213897

(51) Int. Cl.[7] .............................................. G06F 15/16
(52) U.S. Cl. ...................................... 709/206; 358/402
(58) Field of Search ................................ 709/206, 207; 379/100.01, 100.02, 100.08, 100.12, 100.13, 100.17; 358/402, 403, 434, 442, 468

(56) References Cited

U.S. PATENT DOCUMENTS

| 5,666,489 A | * | 9/1997 | Fite et al. .................... 709/220 |
| 6,266,160 B1 | * | 7/2001 | Saito et al. .................. 358/407 |
| 6,335,966 B1 | * | 1/2002 | Toyoda .................. 379/100.06 |
| 6,457,044 B1 | * | 9/2002 | IwaZaki ..................... 709/206 |

FOREIGN PATENT DOCUMENTS

JP           11-65963         3/1999

* cited by examiner

Primary Examiner—Mehmet B. Geckil
(74) Attorney, Agent, or Firm—Frishauf, Holtz, Goodman & Chick, P. C.

(57) ABSTRACT

A sender transforms scanned image data to binary compressed data with a fixed parameter, converts it to e-mail data, adds information indicating its local control system and identification information for a capability request to the e-mail data and sends the resultant e-mail data. When a transmission destination is an electronic mail device, the transmission destination prints the attached page of specific conditions after which communications between the sender and the receiver are terminated. When the transmission destination has the same control device as the sender, the transmission destination transmits a response message to the sender in which information indicating its local control method and a capability response are provided. The sender generates, from image data, binary compressed data whose image size, resolution and coding system are matched with the capability of the transmission destination, converts this binary compressed data to e-mail data and resends the e-mail data.

18 Claims, 10 Drawing Sheets

```
Date:Mon, 8 Mar 1999 16:50:00 +0900
From: foo@domain2.co.jp
Message-Id: <199903080750@domain2.co.jp>
X-mailer: InternetFAX 3rd mode
X-Ifax: capability response
Subject: Disposition notification          HEADER
To: ifax1@domain1.co.jp
MIME-Version: 1.0
Content-Type: multipart/report;
report-type=disposition-notification;
             boundary="xxyyzz"

—xxyyzz
Content-Type: text/plain                   TEXT

The message is sent from InternetFAX.

—xxyyzz
Content-Type: message/disposition-notification

Reporting-UA: ifax-device, domain2.co.jp;
InternetFAX 3rd mode
Original-Recipient: rfc822; foo@domain2.co.jp
Final-Recipient: rfc822; foo@domain2.co.jp
Original-Message-ID:<199903080747@domain1.co.jp>
Disposition: automatic-action/MDN-sent-automatically;
dispatched
Media-Accept-Features: (&(color=Binary)
           (image-file-structure=[TIFF-S, TIFF-F, TIFF-J])
           ( | (&(dpi=200)(dpi-xyratio=200/100))
               (&(dpi=200)(dpi-xyratio=1))
               (&(dpi=300)(dpi-xyratio=1)))
           ( | (image-coding=[MH,MR,MMR])
               (&(image-coding=JBIG)
                   (image-coding-constraint=JBIG-T85)
                   (JBIG-stripe-size=128)))
           (MRC-mode=0)
           (paper-size=[A4,B4]))

—xxyyzz—
```
CAPABILITY INFORMATION

```
Disposition-Notification-To:ifax1@domain1.co.jp  ⎤
Date:Mon,8 Mar 1999 16:47:30 +0900
Message-Id:<199903080747@domain1.co.jp>
MIME-Version:1.0
X-Mailer:InternetFAX 3rd mode                    ⎬ HEADER
X-Ifax:capability request
From:ifax1@domain1.co.jp
Subject:Message from InternetFAX
To:foo@domain2.co.jp
content-Type:multipart/mixed;boundary="aabbcc"   ⎦

--aabbcc                                         ⎤
Content-Type:text/plain                          ⎬ TEXT This message is sent from InternetFAX.           ⎦

--aabbcc                                         ⎤
Content-Type:image/tiff;application=faxbw
Content-Transfer-Encoding:base64

SUkqAAgAAAARAP4ABAABAAAAgAAAAABAwABAAAAwAYAAAEBAwABAAAA
rggAAAIBAwABAAAA                                 ⎬ ATTACHED IMAGE
AQAAAAMBAwABAAAAwAAAAYBAwABAAAAAAAAAoBAwABAAAAAgAABE
BBAABAAAA7AAAABIB
       ⋮
       ⋮
HCQIAMpmBUDZrAAomxUAZbMCoGxWAJTNCoWQFQNisAAiAAAiAAAiAQAw
AAAAAAAAAAAAAAA=
--aabbcc--                                       ⎦
```

FIG. 4

```
Date:Mon, 8 Mar 1999 16:50:00 +0900
From: foo@domain2.co.jp
Message-Id: <199903080750@domain2.co.jp>
X-mailer: InternetFAX 3rd mode
X-Ifax: capability response
Subject: Disposition notification                    HEADER
To: ifax1@domain1.co.jp
MIME-Version: 1.0
Content-Type: multipart/report;
report-type=disposition-notification;
          boundary="xxyyzz"

--xxyyzz
Content-Type: text/plain                             TEXT

The message is sent from InternetFAX.

--xxyyzz
Content-Type: message/disposition-notification

Reporting-UA: ifax-device, domain2.co.jp;
InternetFAX 3rd mode
Original-Recipient: rfc822; foo@domain2.co.jp
Final-Recipient: rfc822; foo@domain2.co.jp
Original-Message-ID:<199903080747@domain1.co.jp>
Disposition: automatic-action/MDN-sent-automatically;
dispatched
Media-Accept-Features: (&(color=Binary)
          (image-file-structure=[TIFF-S, TIFF-F, TIFF-J])
          ( | (&(dpi=200)(dpi-xyratio=200/100))          CAPABILITY INFORMATION
              (&(dpi=200)(dpi-xyratio=1))
              (&(dpi=300)(dpi-xyratio=1)))
          ( | (image-coding=[MH,MR,MMR])
              (&(image-coding=JBIG)
                  (image-coding-constraint=JBIG-T85)
                  (JBIG-stripe-size=128)))
          (MRC-mode=0)
          (paper-size=[A4,B4]))

--xxyyzz--
```

FIG. 6

```
Disposition-Notification-To:ifax1@domain1.co.jp  ⎤
Date:Mon,8 Mar 1999 16:47:30 +0900               │
Message-Id:<199903080747@domain1.co.jp>          │
MIME-Version:1.0                                 ├ HEADER
From:ifax1@domain1.co.jp                         │
Subject:Message from InternetFAX                 │
To:foo@domain2.co.jp                             │
content-Type:multipart/mixed;boundary="aabbcc"   ⎦

--aabbcc                                         ⎤
Content-Type:text/plain                          │
                                                 ├ TEXT
This message is sent from InternetFAX.           │
                                                 ⎦
--aabbcc                                         ⎤
Content-Type:image/tiff;application=faxbw        │
Content-Transfer-Encoding:base64                 │
                                                 │
SUkqAAgAAAARAP4ABAABAAAAgAAAAABAwABAAAAwAYAAAEBAwABAAAA
rggAAAIBAwABAAAA                                 │
AQAAAAMBAwABAAAAwAAAAYBAwABAAAAAAAAAAoBAwABAAAAAgAABE  ├ ATTACHED IMAGE
BBAABAAAA7AAAABIB                                │
  :                                              │
  :                                              │
  :                                              │
HCQIAMpmBUDZrAAomxUAZbMCoGxWAJTNCoWQFQNisAAiAAAiAAAiAQAw │
AAAAAAAAAAAAAAAA=                                │
--aabbcc--                                       ⎦
```

FIG. 9

```
Date:Mon, 8 Mar 1999 16:50:00 +0900
From: foo@domain2.co.jp
Message-Id: <199903080750@domain2.co.jp>
Subject: Disposition notification
To: ifax1@domain1.co.jp                              HEADER
MIME-Version: 1.0
Content-Type: multipart/report;
report-type=disposition-notification;
            boundary="xxyyzz"

--xxyyzz
Content-Type: text/plain
                                                     TEXT
The message is sent from InternetFAX.

--xxyyzz
Content-Type: message/disposition-notification

Reporting-UA: ifax-device, domain2.co.jp;
InternetFAX 3rd mode
Original-Recipient: rfc822; foo@domain2.co.jp
Final-Recipient: rfc822; foo@domain2.co.jp
Original-Message-ID:<199903080747@domain1.co.jp>
Disposition: automatic-action/MDN-sent-automatically;
processded/warning
Warning:Capability Response
Media-Accept-Features: (&(color=Binary)
            (image-file-structure=[TIFF-S, TIFF-F, TIFF-J])
            ( | (&(dpi=200)(dpi-xyratio=200/100))
                 (&(dpi=200)(dpi-xyratio=1))
                 (&(dpi=300)(dpi-xyratio=1)))          CAPABILITY INFORMATION
            ( | (image-coding=[MH,MR,MMR])
                 (&(image-coding=JBIG)
                     (image-coding-constraint=JBIG-T85)
                     (JBIG-stripe-size=128)))
            (MRC-mode=0)
            (paper-size=[A4,B4]))

--xxyyzz--
```

FIG. 11

COMMUNICATION CONTROL METHOD FOR ELECTRONIC MAIL SYSTEM

CROSS-REFERENCE TO RELATED APPLICATIONS

This application is based upon and claims the benefit of priority from the prior Japanese Patent Applications No. 11-156481, filed Jun. 3, 1999; and No. 11-213897, filed Jul. 28, 1999, the entire contents of which are incorporated herein by reference.

BACKGROUND OF THE INVENTION

The present invention relates to a communication control method for an electronic mail system in which a plurality of electronic mail devices transmit and receive images in the form of electronic mail (hereinafter referred to as "e-mail") over a computer network such as the Internet.

IETF (Internet Engineering Task Force) is an organization which determines the standard regulations of the Internet. The standards determined by the IETF will be opened to the public as RFC. While facsimiles which transmit and receive images over telephone lines are very popular, Internet facsimiles are also known which transmit and receive images over the Internet in stead of the telephone lines. The IETF considered the standardization of Internet facsimiles and established the standards for transmission and reception of images using an e-mail. RFC 2305 fixes conditions for image transmission (the number of horizontal pixels: 1728 pixels, resolution: 200×100 dpi or 200×200 dpi and coding system: MH) and defines that an image is converted to a file of the TIFF (Tagged Image File Format) format, attaches this file to an e-mail message according to the MIME (Multipurpose Internet Mail Extensions), the standard e-mail format, and this e-mail message is then transmitted to a designated e-mail address. This specification is for one-sided transmission of an e-mail from a sender to a receiver, which is the same as an ordinary electronic mail system used in personal computers or the like. This system is hereinafter referred to as "first mode". As apparent from the above, an Internet facsimile can be said to be one kind of electronic mail devices capable of transmitting and receiving images using an e-mail.

In the first mode, the sender cannot know whether or not the transmission destination or receiver has received and processed a transmitted image properly. As only images under the fixed conditions are permitted, it is not possible to transmit images with a higher quality. In this respect, the standards that enable the detection of the capability of a receiver and the confirmation of delivery were set up as RFC 2532. This system is hereinafter referred to as "second mode". At the time an e-mail message attached with a TIFF file is transmitted, a response message from the receiver is requested. This response message is created by using DSN (Delivery Status Notifications) or MDN (Message Disposition Notifications).

Upon reception of an e-mail message attached with a TIFF file, the transmission destination or receiver performs processes, such as displaying the image and printing it, describes the processing result and the local capability in a DSN/MDN message and sends this DSN/MDN message back to the sender. As a result, the sender can confirm the delivery as well as know the receiver's capability through the DSN/MDN message. The receiver's capability is used in later image transmission so that images can be transmitted to this transmission destination under the conditions that match the receiver's capability. When the capability of a receiver is unknown as in the case where, for example, it is the first transmission to that destination, an image under the fixed conditions of the first mode, which can surely be processed by any receiver, should be transmitted.

Even if the receiver supported the second mode, it would be inevitable to send images of the same quality as that allowed by the first mode. One way to solve this problem is to define a capability-requesting e-mail, sends this capability-requesting e-mail to the transmission destination before image transmission, receives a response on the capability from the receiver, and then transmit an image which is matched with the capability.

This method however has the following shortcoming. In a case of transmitting an image to a transmission destination whose capability is unknown, if the receiver is an electronic mail device which has the same capability as the sender, the receiver understands a capability-requesting e-mail, if sent prior to image transmission, and sends back a response on the capability. If a capability-requesting e-mail is sent to an electronic mail device which has ordinary e-mail software installed therein, however, the receiver cannot understand the capability-requesting e-mail so that the subsequent behavior of the receiver is not predictable. That is, interoperability is ruined when a capability-requesting e-mail is sent to an electronic mail device which has ordinary e-mail software installed therein.

Another solution to the aforementioned problem is disclosed in Jpn. Pat. Appln. KOKAI Publication No. 11-65963, which appends an image file added with capability request information to an e-mail and asks a receiver to return a response before scanning an image, scans an image which is matched with the capability to generate an image file by and transmits an e-mail attached with that image file.

That is, this publication discloses such a technique that when an image file to be attached to an e-mail is a TIFF file, a sender describes a capability request message in a tag (Image Description) which indicates the contents of a TIFF file defined by the TIFF specifications. Then, an e-mail attached with an image file to which a capability request message is added is transmitted to a transmission destination before scanning an original image. In this case, the image file does not include actual image data.

A receiver which has the same capability as the sender receives the image file, and identifies the capability request message added to the image file. Then, like the sender, the receiver describes a capability response message teaching its own reception capability in a tag (Image Description) which indicates the contents of a TIFF file defined by the TIFF specifications. The receiver attaches an image file added with this capability response message to an e-mail and then sends this e-mail to the sender. In this case too, the image file does not include actual image data.

The sender performs such control as to acquire capability information of the transmission destination from the capability response message added to the image file and transmit a scanned original image to the transmission destination in the form of an image file which satisfies the conditions matched with the capability information.

According to this communication control method, in the case of transmitting an image to a transmission destination whose capability is unknown, if a transmission destination is an electronic mail device which has the same capability as the sender, the transmission destination can understand a capability-requesting image file transmitted before image transmission and send back a response indicating the receiver's capability. If such a capability-requesting image file is sent to an electronic mail device which has ordinary e-mail software installed therein, however, this device cannot understand the capability request or cannot make a capability response, and cannot therefore display or print the image file. As a result, the receiver informs the sender of an error or may hang up in an image-file processing routine in the worst case due to the inadequate file structure of the received image file that contains no actual image data. That is, interoperability to an electronic mail device which has ordinary e-mail software installed therein is ruined.

BRIEF SUMMARY OF THE INVENTION

Accordingly, it is an object of the present invention to provide a communication control method for an electronic mail system, which, in a case of transmitting an image in the form of an e-mail to a transmission destination whose capability is unknown, can guarantee interoperability even if the transmission destination is an electronic mail device which has ordinary e-mail software installed therein, and can detect the capability of the transmission destination if the destination has the same function as the sender and can transmit an image according to that capability.

To achieve the above object, according to one aspect of this invention, there is provided a communication control method for an electronic mail system comprising a plurality of electronic mail devices, wherein an electronic mail device to be a sender adds identification information to an e-mail, attaches an image of specific conditions to the e-mail and transmits the e-mail; when identifying the identification information in a received e-mail, an electronic mail device to be a receiver adds identification information and local capability information to an e-mail to be transmitted and transmits the e-mail; when identifying the identification information in a received e-mail, the electronic mail device to be the sender acquires the capability information from that e-mail, attaches an image matched with the acquired capability information to an e-mail to be transmitted and transmits the e-mail; and the electronic mail device to be the receiver processes the image attached to the received e-mail.

According to this invention, in a case where an image is transmitted in the form of an e-mail to a transmission destination whose capability is unknown, it is possible to guarantee interoperability even if the transmission destination an electronic mail device which has ordinary e-mail software installed therein, and to detect the capability of the transmission destination if the destination has the same function as the sender and transmit an image according to that capability.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a diagram exemplifying an e-mail message which is transmitted by the sender Internet facsimile according to the first embodiment;

FIG. 6 is a diagram exemplifying an MDN message which is transmitted by the receiver Internet facsimile having the same capability as the sender according to the first embodiment;

FIG. 9 is a diagram exemplifying an e-mail message which is transmitted by the sender Internet facsimile according to the second embodiment;

FIG. 11 is a diagram exemplifying an MDN message which is transmitted by the receiver Internet facsimile having the same capability as the sender according to the second embodiment.

DETAILED DESCRIPTION OF THE INVENTION

The first embodiment of the present invention will be described below with reference to FIGS. 1 through 6.

Figure 1:
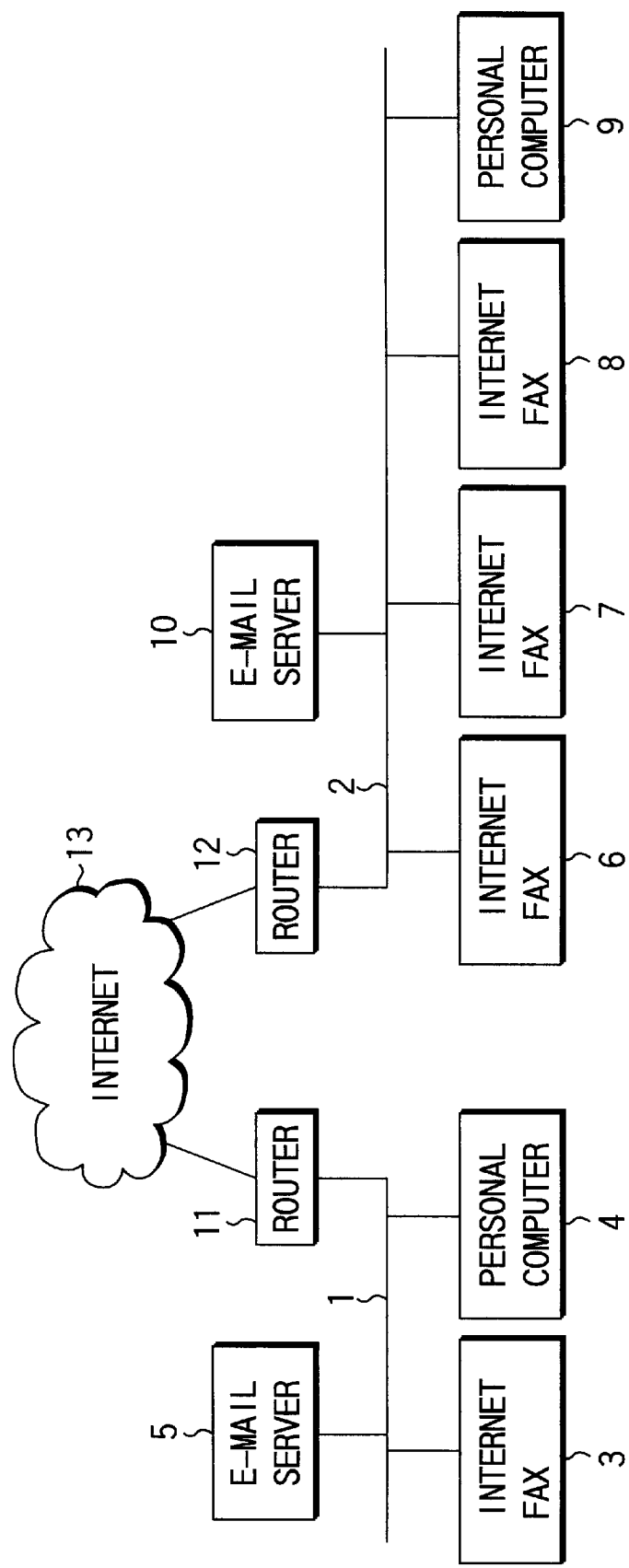
FIG. 1 is a block diagram illustrating the structure of an electronic mail system according to first and second embodiments.

FIG. 1 is a block diagram illustrating the structure of an electronic mail system. This electronic mail system has an Internet facsimile 3 and a personal computer 4, both electronic mail devices, and an e-mail server 5 all connected to a single network 1, and three Internet facsimiles 6, 7 and 8 and a personal computer 9, which are electronic mail devices, and an e-mail server 10 all connected to another network 2. The individual networks 1 and 2 are connected to an Internet 13 via routers 11 and 12, respectively.

The Internet facsimile 6 is a first-mode Internet facsimile which sends an e-mail one-sided to a receiver. The Internet facsimile 7 is a second-mode Internet facsimile which can detect the capability of a transmission destination and confirm the delivery of an e-mail.

Each of the Internet facsimiles 3 and 8 has means for acquiring capability information of a transmission destination which is added to an e-mail and means for transmitting an image in the form of an e-mail under either of the condition of transmitting an image with fixed image conditions or the condition of transmitting an image according to the capability of the transmission destination, both means functioning at the time of transmitting an e-mail, and further has means for adding capability information to an e-mail and means for processing an image attached to an e-mail, both means functioning at the time of receiving an e-mail. Each Internet facsimile 3 or 8 further has means for adding identification information to an e-mail according to the standard e-mail format and means for identifying the identification information added to an e-mail, both means functioning in transmission/reception.

The Internet facsimile 3 and personal computer 4 perform transmission and reception of an e-mail to the e-mail server 5 connected to the network 1, and the Internet facsimiles 6, 7 and 8 and personal computer 9 perform transmission and reception of an e-mail to the e-mail server 10 connected to the network 2.

When an e-mail is transmitted from an Internet facsimile or a personal computer, each of the e-mail servers 5 and 10 delivers the e-mail to the adequate e-mail server over the Internet 13 based on a designated e-mail address. When the Internet facsimile 3 transmits an e-mail with a designated e-mail address to the Internet facsimile 7, for example, the e-mail server 5 delivers the e-mail to the e-mail server 10 over the Internet 13.

The Internet facsimile 3 and the personal computer 4 are each designed to receive an e-mail by acquiring the e-mail that has been delivered to the local mail box in the e-mail server 5, whereas the Internet facsimiles 6 to 8 and the personal computer are each designed to receive an e-mail by acquiring the e-mail that has been delivered to the local mail box in the e-mail server 10. Note that the e-mail servers may be set to directly transfer an e-mail to an Internet facsimile and personal computer.

Figure 2:
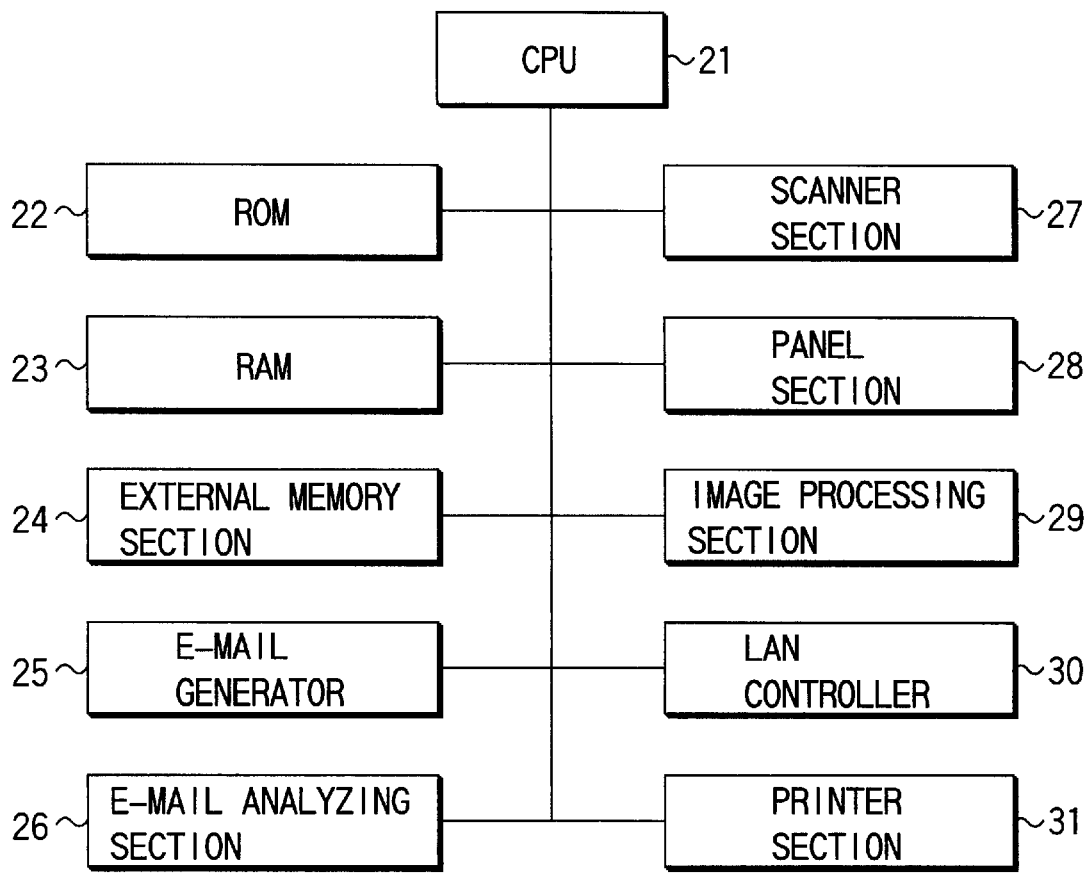
FIG. 2 is a block diagram illustrating the structure of an Internet facsimile according to the first and second embodiments.

FIG. 2 is a block diagram illustrating the structure of each of the Internet facsimiles 3, 6, 7 and 8 which transmit and receive an image in the form of an e-mail. A CPU (Central Processing Unit) 21 constitutes the body of the control section. Stored in a ROM (Read Only Memory) 22 are an operation program for the CPU 21 to control the individual sections and various kinds of setting data. A RAM (Random Access Memory) 23 temporarily stores various kinds of data that the CPU 21 needs in executing various processes. The CPU 21 operates to perform the general control of the individual sections of this Internet facsimile based on the operation program stored in the ROM 22, thereby permitting the Internet facsimile to accomplish the designed functions.

An external storage section 24, such as a hard disk drive, stores image data and e-mail data. An e-mail generator 25 converts binary compressed data, obtained by compressing image data, to e-mail data of a predetermined e-mail format. This e-mail data is constructed by adding a header, which describes the e-mail address of a transmission destination or a receiver, the e-mail address of a sender, the data format, the system for conversion to character codes and so forth, to character code data which is acquired by converting binary compressed data to a combination of character codes each of 7 bits.

An e-mail analyzing section 26 acquires binary compressed data from e-mail data which has been constructed by converting the binary compressed data. A scanner section 27 scans an original to generate image data. A panel section 28 comprises an operation section, which has key switches a user uses to give various instructions to an Internet facsimile, and a display section which has, for example, a liquid crystal display for presenting various kinds of information to the user.

An image processing section 29 performs enlargement and reduction of image data, compresses image data to acquire binary compressed data and decompress binary compressed data to restore image data. An LAN controller 30 performs transmission and reception of e-mail data over a computer network. A printer 31 prints an image indicated by image data.

Figure 3:
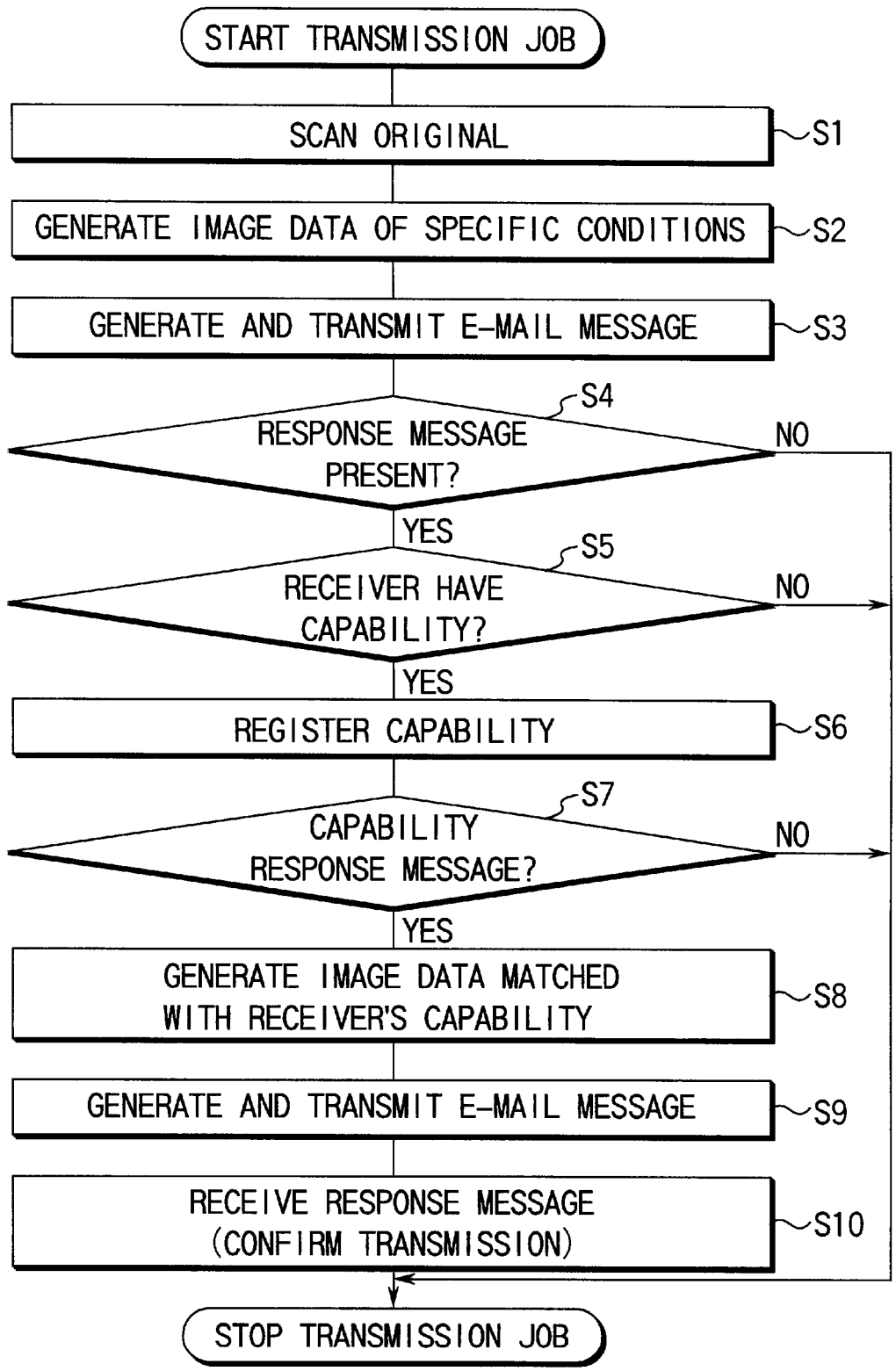
FIG. 3 is a flowchart illustrating the transmission operation of an Internet facsimile as a sender when the capability of a transmission destination is unknown according to the first embodiment.

FIG. 3 is a flowchart illustrating the transmission operation of the Internet facsimiles 3 and 8 when the capability of a transmission destination is unknown. First, the user places an original to be transmitted on the scanner section 27 and sets desired parameters such as the resolution through the panel section 28. As the capability of the transmission destination is unknown then, the original is scanned with the maximum capability of the local Internet facsimile. Then, the user enters the e-mail address of the transmission destination through the panel section 28 and presses a start button.

As a result, the scanner section 27 scans the original and the scanned image data is stored in the external storage section 24 in step S1. In the next step S2, the image processing section 29 generates binary compressed data with fixed parameters (the number of horizontal pixels: 1728 pixels, resolution: 200 dpi and coding system: MH), defined for the first mode, from the stored image data and stores the data in the RAM 23.

In the subsequent step S3, the e-mail generator 25 converts the binary compressed data to e-mail data of the e-mail format, thereby generating an e-mail message. At this time, the e-mail generator 25 adds identification information indicating the local control method, which has been so determined as to be recognizable by Internet facsimiles that have the same capability as the local Internet facsimile, to an e-mail.

Here, an "X-Mailer:" field that indicates the device which has prepared this e-mail message and an " X-Ifax:" field that indicates the type of the e-mail message are added to the header. The fields starting with "X-" indicate user defined fields. This user defined field is defined in the standard e-mail format. A sequence of characters which represents identification information is described in a field which starts with "X-". Information indicating the local control method is described in the "X-Mailer:" field and information for identifying the type of an e-mail is described in the "X-Ifax:" field.

At the time of transmitting this e-mail, a response message from the receiver is requested. The following describes the case where MDN is used. A request for an MDN message is made by adding a "Disposition-Notification-To:" field to the header of an e-mail to be transmitted and describing an e-mail address for a response or the e-mail address of the sender in this field. If the receiver is designed for MDN, the receiver recognizes this field and returns an MDN message to the sender.

FIG. 4 shows one example of the generated e-mail message. Although an image of specific conditions is attached to the e-mail message, this e-mail message requests the capability of the receiver. The LAN controller 30 transmits this e-mail message to the e-mail address of the designated destination.

When the transmission destination or receiver conforms to RFC 2305, i.e., when it is a first-mode Internet facsimile, the receiver performs such a process as printing the attached image of specific conditions. The user defined field that starts with "X-" is ignored and the flow is terminated after the process such as printing because the receiver is not designed for MDN.

When the receiver is a personal computer, on the other hand, the receiver displays the received e-mail message and image and ignores the user defined field. If e-mail software installed in the personal computer can handle MDN, the receiver returns an MDN message to the sender. MDN is defined by RFC 2298, and described in the MDN message are the result of processing the received message, such as display, printing or deletion.

When the transmission destination or receiver conforms to RFC 2532, i.e., when it is a second-mode Internet facsimile, the receiver performs such a process as printing the attached image of specific conditions and ignores the user defined field. RFC 2532 defines that the capability of a receiver should be described together with the processing result in an MDN message. The description method is defined in RFC 2530 and RFC 2531. An MDN message in which the processing result and capability are described is sent back to the sender.

The receiver can identify identification information sent from the sender when the receiver is an Internet facsimile which carries out the same control method as that of the sender, or an Internet facsimile which comprises means for acquiring capability information of a transmission destination which is added to an e-mail, means for transmitting an image in the form of an e-mail under either of the condition of transmitting an image with fixed image conditions or the condition of transmitting an image according to the capability of the transmission destination, means for adding capability information to an e-mail, means for processing an image attached to an e-mail, means for adding identification information to an e-mail according to the standard e-mail format and means for identifying the identification information added to an e-mail.

The reception operation of this Internet facsimile will now be discussed with reference to FIG. 5. When this Internet facsimile receives an e-mail message in step S11, the e-mail analyzing section 26 checks the user defined field in the header of the received e-mail message, knows that the sender is an Internet facsimile which executes the same control method as the receiver from "X-Mailer: Internet FAX 3rd mode", and knows that the message is requesting the capability from an "X-Ifax: capability request" in step S12. When the receiver recognizes those identification information, it does not perform such a process as printing on the image.

In step S13, the e-mail generator 25 generates an MDN message in which the processing result and capability are described and the LAN controller 30 returns the MDN message to the sender. A user defined field is added to the header of the then MDN message. Information indicating the control method of the receiver is described in the "X-Mailer:" field which indicates the device that has prepared this e-mail message and a capability response as information for identifying the type of that e-mail message is described in the "X-Ifax:" field. FIG. 6 shows one example of this MDN message.

In step S4 in FIG. 3, the sender determines if a response message in the form of MDN has been sent from the receiver. If the response message has not come, the sender determines that the receiver is a personal computer or a first-mode Internet facsimile and terminates the transmission job.

If a response message has been delivered, the sender then determines in step S5 if the capability of the receiver is described in that message. If the receiver's capability is not described, the sender determines that the receiver is a personal computer and terminates the transmission job. As the processing result is described in the response message then, the processing result is recorded in transmission history information. If the receiver's capability is described in the response message, the sender records the capability together with the e-mail address of the receiver in the address book or the like of the sender in step S6.

In the subsequent step S7, it is determined if the message is a capability response message. Specifically, the sender checks the user defined field and determines that the receiver is a second-mode Internet facsimile if the field is not the "X-Mailer: Internet FAX 3rd mode", and records the processing result in the transmission history information before terminating the transmission job. If the user defined field is the "X-Mailer: Internet FAX 3rd mode", the sender determines that the receiver is an Internet facsimile which executes the same control method as that of the sender and understands that the message is a capability response message from the "X-Ifax: capability response".

In the next step S8, the image processing section 29 generates binary compressed data whose image size, resolution and coding system are matched with the capability of the receiver that is recorded in the address book, from the image data stored in the external storage section 24, and stores the binary compressed data in the RAM 23. In the subsequent step S9, the e-mail generator 25 converts the binary compressed data to e-mail data of the e-mail format, thus generating an e-mail message. At this time, the "Disposition-Notification-To:" field that requests MDN, "X-Mailer: Internet FAX 3rd mode", and the e-mail address of the sender, "X-Ifax: image transmission", are added to the header of the e-mail. This e-mail message is then transmitted to the e-mail address of the designated destination.

Figure 5:
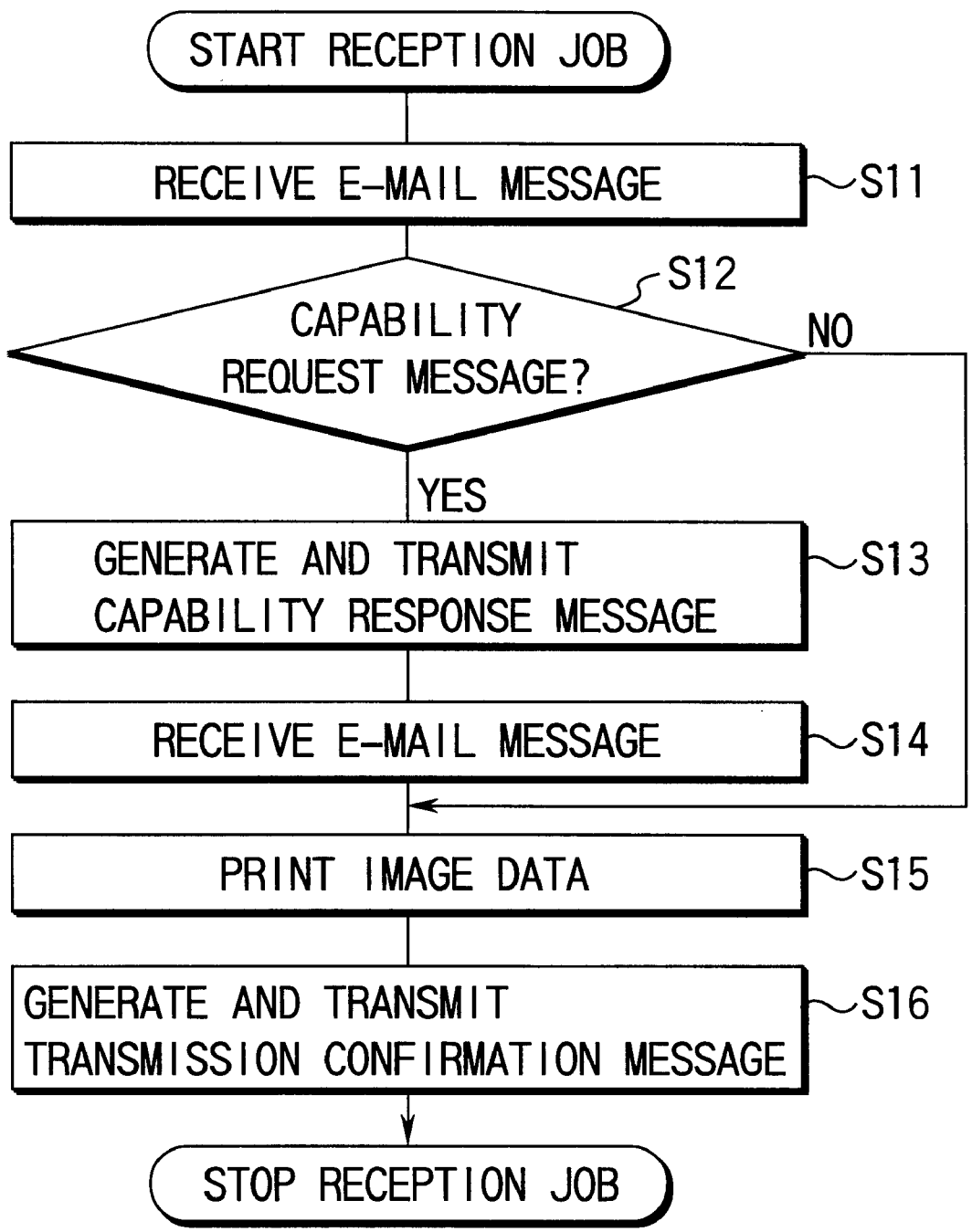
FIG. 5 is a flowchart illustrating the transmission operation of a receiver Internet facsimile which has the same capability as the sender according to the first embodiment.

In step S14 in FIG. 5, the receiver receives the e-mail message, and understands that the message is an e-mail message transmitted with an image from the "X-Ifax: image transmission". In step S15, the receiver performs a process of printing the image or the like. In step S16, the receiver describes the processing result and its capability in an MDN message, adds "X-Mailer: Internet FAX 3rd mode" and "X-Ifax: confirmation" in the header and transmits the message.

The sender understands that the received message is a transmission confirmation message from the "X-Ifax: confirmation" in the transmitted MDN message and records the transmission history information in step S10 in FIG. 3 before terminating the transmission job. As the capability of the receiver is also described in the MDN message, the capability information of the receiver's e-mail address in the address book may be updated.

When an image is transmitted in the form of an e-mail to a transmission destination whose capability is unknown, as apparent from the above, it is possible to transmit an image of specific conditions to the transmission destination even if the transmission destination is an Internet facsimile or personal computer which has ordinary e-mail software installed therein, thereby guaranteeing interoperability. Further, the sender can detect the capability of the receiver and can transmit an image according to that capability when the receiver Internet facsimile has the same functions as the sender, which carries out the same control method as that of the sender, or an Internet facsimile which comprises means for acquiring capability information of a transmission destination which is added to an e-mail, means for transmitting an image in the form of an e-mail under either of the condition of transmitting an image with fixed image conditions or the condition of transmitting an image according to the capability of the transmission destination, means for adding capability information to an e-mail, means for processing an image attached to an e-mail, means for adding identification information to an e-mail according to the standard e-mail format and means for identifying the identification information added to an e-mail.

When the capability of the receiver is known in advance, an image which is matched with the receiver's capability is transmitted from the beginning. Although MDN is used as a mechanism for a response message, the same electronic mail transmission method is employed even if DSN is used.

Although, as identification information from the receiver, "X-Mailer: Internet FAX 3rd mode" indicating the local control method is described in the "X-Mailer:" field which indicates the device that has prepared an e-mail message and the capability request "X-Ifax: capability request" as information for identifying the type of an e-mail is described in the "X-Ifax:" field in this embodiment, the invention is not limited to this particular mode. As identification information, the type of an e-mail alone may be described in the "X-Ifax:" field.

An agreement may be made such that as long as any one of capability request information, capability response information image-attached information is described in the "X-Ifax:" field, the e-mail is coming from an Internet facsimile which comprises means for acquiring capability information of a transmission destination which is added to an e-mail, means for transmitting an image in the form of an e-mail under either of the condition of transmitting an image with fixed image conditions or the condition of transmitting an image according to the capability of the transmission destination, means for adding capability information to an e-mail, means for processing an image attached to an e-mail, means for adding identification information to an e-mail according to the standard e-mail format and means for identifying the identification information added to an e-mail.

Information indicating the local control system, "X-Mailer: Internet FAX 3rd mode", alone may be described in the "X-Mailer:" field as identification information. In this case, an agreement may be made in such a way that if the receiver is an Internet facsimile which comprises means for acquiring capability information of a transmission destination which is added to an e-mail, means for transmitting an image in the form of an e-mail under either of the condition of transmitting an image with fixed image conditions or the condition of transmitting an image according to the capability of the transmission destination, means for adding capability information to an e-mail, means for processing an image attached to an e-mail, means for adding identification information to an e-mail according to the standard e-mail format and means for identifying the identification information added to an e-mail, when the receiver identifies identification information from the sender, the receiver checks the user defined field in the header of the received e-mail message and understands that the sender has the same means as the receiver if the field is "X-Mailer: Internet FAX 3rd mode" and that the message is a capability request message.

When identifying this identification information, the receiver does not carry out printing or the like of the attached image of specific conditions. Then, the e-mail generator 25 generates an MDN message in which the processing result and capability are described and the LAN controller 30 returns a response message. The user defined field is added to the header of the then MDN message. Information, "X-Mailer: Internet FAX 3rd mode", which indicates that the receiver is an Internet facsimile having the same means as the sender is described in the "X-Mailer:" field that indicates the device which has prepared this e-mail message.

The sender determines if an MDN-based response message has been sent from the receiver. If the receiver's capability is described in the response message, the sender records that capability together with the receiver e-mail address in the address book of the sender. Then, the sender checks the user defined field in the header of the response message and understands that the receiver is an Internet facsimile equipped with the same means as the sender and the message is a capability request message if the field is "X-Mailer: Internet FAX 3rd mode".

Then, the image processing section 29 generates binary compressed data whose image size, resolution and coding system are matched with the capability of the receiver that is recorded in the address book, from the image data stored in the external storage section 24, and converts the binary compressed data to e-mail data of the e-mail format, thus generating an e-mail message. At this time, the "Disposition-Notification-To:" field that requests MDN, "X-Mailer: Internet FAX 3rd mode", and the e-mail address of the sender, "X-Ifax: image transmission", are added to the header of the e-mail. This e-mail message is then transmitted to the e-mail address of the designated destination.

The receiver performs a process, such as printing the attached image, describes the processing result and the capability of the receiver in an MDN message and then transmits the MDN message to the sender. The sender records the processing result in the received MDN message in the transmission record information and then terminates the transmission job. As the capability of the receiver is also described in the MDN message, the capability information of the receiver's e-mail address in the address book may be updated.

As apparent from the above, even if the capability request "X-Ifax: capability request" is not described as information for identifying the type of an e-mail, the same control as that of the first embodiment can be carried out to provide the same advantages as long as an adequate agreement concerning the description is made in advance.

Although identification information is described in the user defined field according to the first embodiment, the same control as done in the first embodiment can be carried out to provide the same advantages if such identification information is described in the header portion in the standard e-mail format, such as the "subject" field, or is described in the text of an e-mail and an adequate agreement concerning the description is made in advance.

The second embodiment of the present invention will be described below with reference to FIGS. 1, 2 and 7 through 11. The following will what differs from the first embodiment in FIGS. 1 and 2.

Each of the Internet facsimiles 3 and 8 is an Internet facsimile that comprises, as the functions of a sender which transmits an image-attached e-mail, means for adding identification information to an image file obtained by converting an image of specific conditions to an e-mail format, means for acquiring capability information of a transmission destination which is added to an e-mail, means for transmitting an image of specific conditions or an image whose conditions are matched with the capability information of the destination, and comprises, as the functions of a receiver, means for identifying identification information added to and image of specific conditions, means for adding identification information to an e-mail according to the standard e-mail format, and means for processing the image attached to the e-mail.

The e-mail generator 25 generates an image file of specific conditions to which identification information is added, from binary compressed data obtained by compressing image data, and converts the image file to e-mail data of a predetermined e-mail format. This e-mail data is constructed by adding a header, which describes the e-mail address of a transmission destination or a receiver, the e-mail address of a sender, the data format, the system for conversion to character codes and so forth, to character code data which is acquired by converting binary compressed data to a combination of character codes each of 7 bits.

The e-mail analyzing section 26 acquires an image file from e-mail data which has been constructed by converting the image file.

Figure 7:
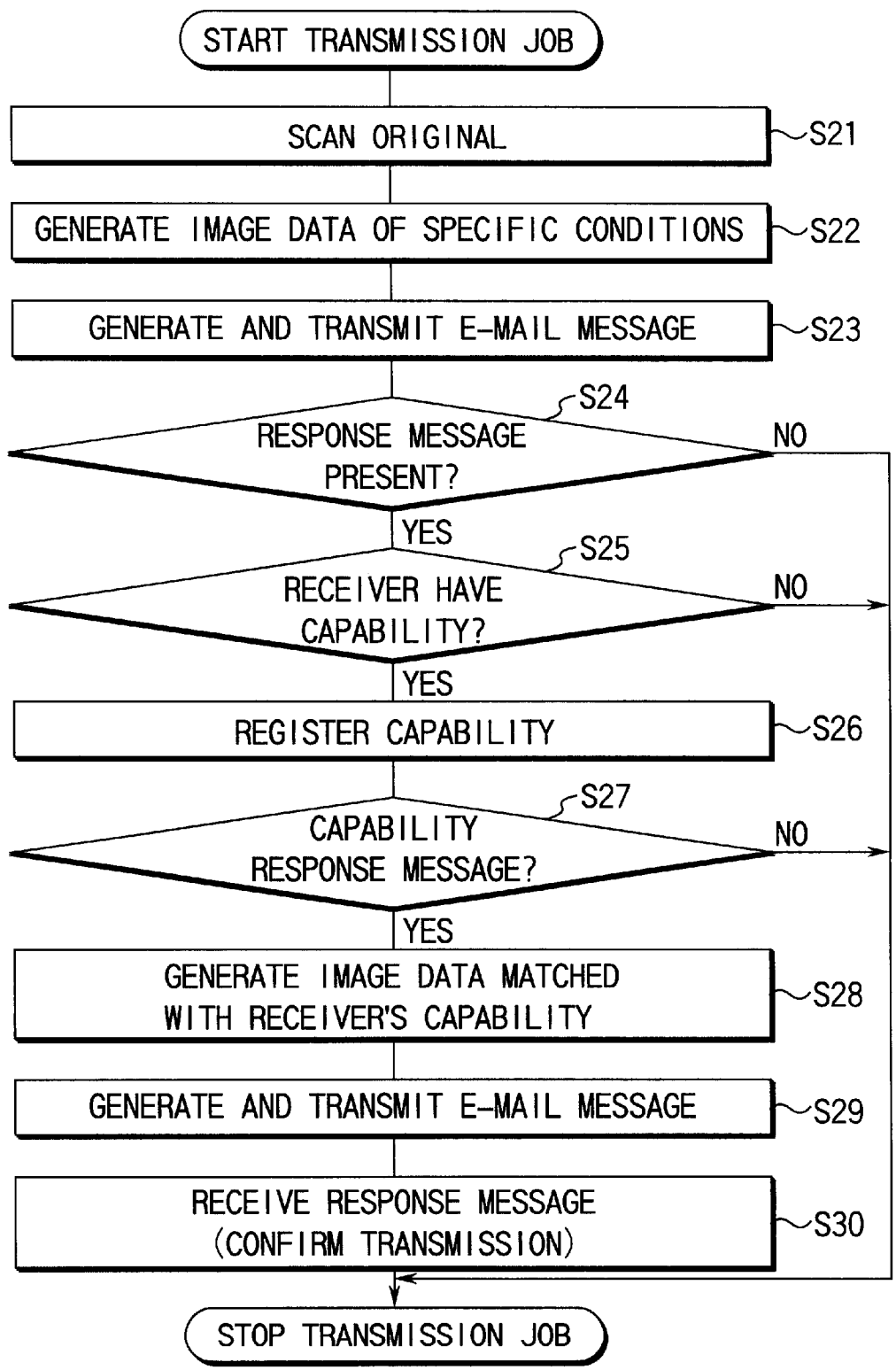
FIG. 7 is a flowchart illustrating the transmission operation of an Internet facsimile as a sender when the capability of a transmission destination is unknown according to the second embodiment.

FIG. 7 is a flowchart illustrating the transmission operation of the Internet facsimiles 3 and 8 when the capability of a transmission destination is unknown. First, the user places an original to be transmitted on the scanner section 27 and sets desired parameters such as the resolution through the panel section 28. As the capability of the transmission destination is unknown then, the original is scanned with the maximum capability of the local Internet facsimile. Then, the user enters the e-mail address of the transmission destination through the panel section 28 and presses a start button.

As a result, the scanner section 27 scans the original and the scanned image data is stored in the external storage section 24 in step S21. In the next step S22, the image processing section 29 generates binary compressed data with fixed parameters (the number of horizontal pixels: 1728 pixels, resolution: 200 dpi and coding system: MH), defined for the first mode, from the stored image data and stores the data in the RAM 23.

Figure 8:
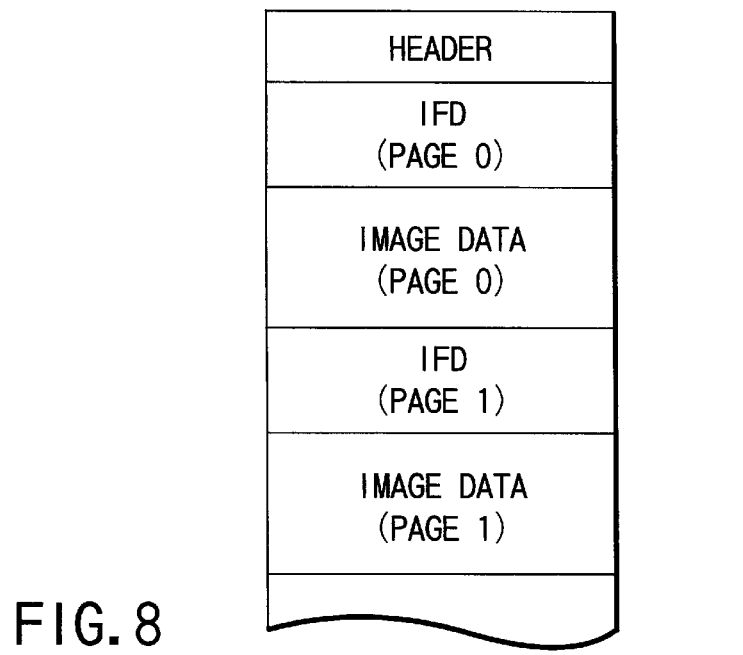
FIG. 8 is a diagram showing the structure of a TIFF file according to the second embodiment.

In the subsequent step S23, the e-mail generator 25 generates an identification-information added image file of specific conditions and converts the image file to e-mail data of the e-mail format, thereby generating an e-mail message. That is, an image file is generated according to the TIFF format defined by RFC 2301. As shown in FIG. 8 showing the TIFF data structure, following the header indicating TIFF are IFD (Image File Directory) indicating information of each page and image data for each page.

Described in the IFD are various kinds of information of image data, called tags, such as the number of horizontal pixels (Image Width), the number of vertical pixels (Image Length), resolution (X resolution/Y resolution), coding system (Compression) and page number (Page Number), together with the values of the tags. It may be possible to describe a tag (Image Description) indicating the content of a TIFF file together with an arbitrary number of ASCII characters in the IFD.

The e-mail generator 25 describes a sequence of characters "Capability Request" in this tag so as to indicate that this TIFF file requests the capability of the receiver. The character sequence "Capability Request" is identification information that has been designed to be able to identify an Internet facsimile which executes the same control method as that of the local device. Note that the Image Description tag has only to be described in the IFD of the first page.

At the time of transmitting this e-mail attached with this TIFF file, a response message from the receiver is requested. The following describes the case where MDN, the standard system for e-mails, is used. A request for an MDN message is made by adding a "Disposition-Notification-To:" field to the header of an e-mail to be transmitted and describing an e-mail address for a response or the e-mail address of the sender in this field. If the receiver is designed for MDN, the receiver recognizes this field and returns an MDN message to the sender.

FIG. 9 shows one example of the generated e-mail message. Although an image of specific conditions is attached to the e-mail message, a sequence of characters requesting the capability of the receiver is described in the image file. The LAN controller 30 transmits this e-mail message to the e-mail address of the designated destination.

When the transmission destination or receiver conforms to RFC 2305, i.e., when it is a first-mode Internet facsimile, the receiver performs such a process as printing the attached image of specific conditions. As the Image Description tag in an image file is normally treated as a simple comment, the sequence of characters described in the tag is not recognized and is ignored and, what is more, it is designed for MDN, so that the flow is terminated after the execution of the process such as printing.

When the receiver is a personal computer, on the other hand, the receiver displays the received e-mail message and image, and as the Image Description tag in an image file is normally treated as a simple comment, the sequence of characters described in the tag is not recognized and is ignored, and the flow is terminated after printing or the like. If e-mail software installed in the personal computer is capable of handling MDN, the receiver returns an MDN message to the sender. MDN is defined by RFC 2298, and described in the MDN message are the result of processing the received message, such as display, printing or deletion.

When the transmission destination or receiver conforms to RFC 2532, i.e., when it is a second-mode Internet facsimile, the receiver performs such a process as printing the attached image of specific conditions. As the Image Description tag in an image file is normally treated as a simple comment, the sequence of characters described in the tag is not recognized and is ignored. RFC 2532 defines that the capability of a receiver should be described together with the processing result in an MDN message. The description method is defined in RFC 2530 and RFC 2531. An MDN message in which the processing result and capability are described is sent back to the sender.

The communication destination can identify identification information sent from the sender when the communication destination is an Internet facsimile which carries out the same communication control method as that of the sender, i.e., when the communication destination is an Internet facsimile that comprises, as the functions of the receiver which receives an e-mail, means for identifying the identification information added to an image file of specific conditions, means for adding identification information to an e-mail according to the standard e-mail format and means for processing an image attached to an e-mail.

The reception operation of this Internet facsimile will now be discussed with reference to FIG. 10. When this Internet facsimile receives an e-mail message in step S31, the e-mail analyzing section 26 acquires an image file from the received e-mail message, analyzes the image file, and knows that the message is requesting the capability because of the sequence of characters "Capability Request" described in the Image Description tag in step S32. When the receiver recognizes this identification information, it does not perform such a process as printing on the image.

In step S33, the e-mail generator 25 generates an MDN message in which the processing result and capability are described and the LAN controller 30 returns the MDN message to the sender. As the processing result, "processed/warning" is described in the "Disposition:" field and "Capability Response" is described in the "Warning:" field. The sequence of characters "Capability Request" is identification information established so as to be identifiable by the sender Internet facsimile which performs the same communication control method as that of the receiver. FIG. 11 shows one example of this MDN message.

In step S24 in FIG. 7, the sender determines if a response message in the form of MDN has been sent from the receiver. If the response message has not come, the sender determines that the receiver is a personal computer or a first-mode Internet facsimile and terminates the transmission job.

If a response message has been delivered, the sender then determines in step S25 if the capability of the receiver is described in that message. If the receiver's capability is not described, the sender determines that the receiver is a personal computer and terminates the transmission job. As the processing result is described in the response message then, the processing result is recorded in transmission history information. If the receiver's capability is described in the response message, the sender records the capability together with the e-mail address of the receiver in the address book or the like of the sender in step S26.

In the subsequent step S27, it is determined if the message is a capability response message. Specifically, when "processed/warning" is not described in the "Disposition:" field, or even if such description is made, when "Capability Response" is not described in the "Warning:" field, the sender determines that the receiver is a second-mode Internet facsimile, and records the processing result in the transmission history information before terminating the transmission job. If "processed/warning" is described in the "Disposition:" field and "Capability Response" is described in the "Warning:" field, the sender understands that the message is a capability response message.

In the next step S28, the image processing section 29 generates binary compressed data whose image size, resolution and coding system are matched with the capability of the receiver that is recorded in the address book, from the image data stored in the external storage section 24, and stores the binary compressed data in the RAM 23. In the subsequent step S29, the e-mail generator 25 generates an image file from binary compressed data and converts the image file to e-mail data of the e-mail format, thus generating an e-mail message. Although the Image Description tag need not be described in the then image file, the "Disposition-Notification-To:" field that requests MDN and the e-mail address of the sender are added to the header of the e-mail. This e-mail message is then transmitted to the e-mail address of the designated destination.

Figure 10:
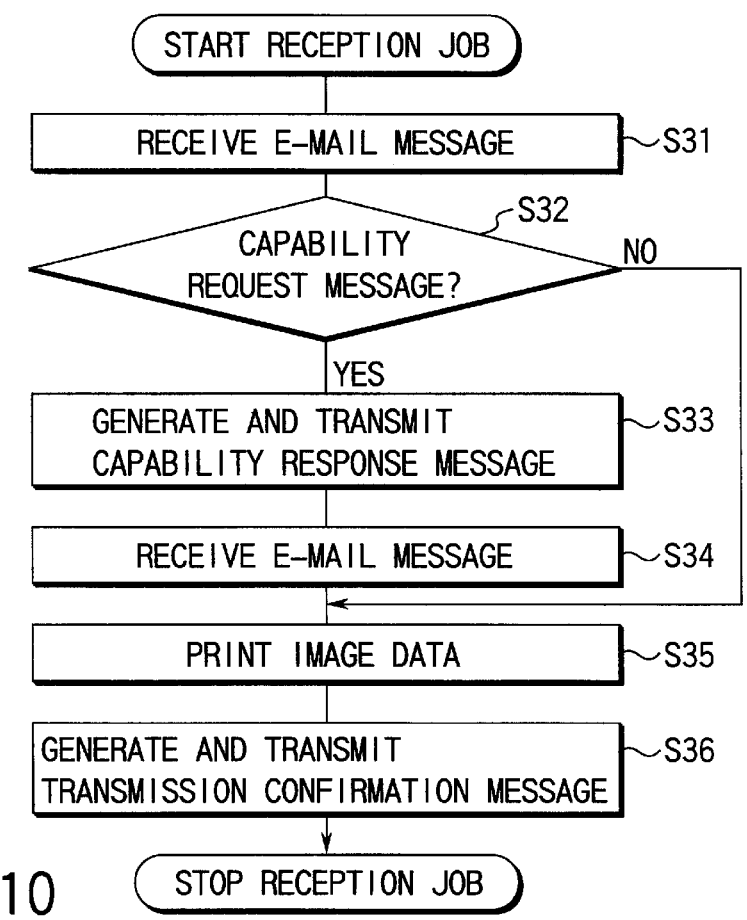
FIG. 10 is a flowchart illustrating the transmission operation of a receiver Internet facsimile which has the same capability as the sender according to the second embodiment.

In step S34 in FIG. 10, the receiver receives the e-mail message. In step S35, the receiver performs a process, such as printing the attached image. In step S36, the receiver describes the processing result and its capability in an MDN message, and transmits the message to the sender. The sender records the processing result in the returned MDN message in the transmission history information in step S30 in FIG. 7 before terminating the transmission job. As the capability of the receiver is also described in the MDN message, the capability information of the receiver's e-mail address in the address book may be updated.

When an image is transmitted in the form of an e-mail to a transmission destination whose capability is unknown, as apparent from the above, it is possible to transmit an image of specific conditions to the transmission destination even if the transmission destination is an existing first-mode or second-mode Internet facsimile or a personal computer which has ordinary e-mail software installed therein, thereby guaranteeing interoperability. Further, at the time of making a capability request and a capability response, a personal computer which has ordinary e-mail software installed therein and a firs-mode or second-mode Internet facsimile do not receive an inadequate file structure that contains no actual image data. This prevents such a personal computer or Internet facsimile from hanging up in the routine of processing the received image file.

Furthermore, when the communication destination or receiver is an Internet facsimile which carries out the same communication control method as that of the sender, i.e., an Internet facsimile that comprises, as the functions of the receiver which receives an e-mail, means for identifying the identification information added to an image file of specific conditions, means for adding identification information to an e-mail according to the standard e-mail format and means for processing an image attached to an e-mail, the sender can detect the capability of the receiver and can transmit an image matched with that capability.

If the receiver's capability is known in advance, the sender sends an image matched with the receiver's capability from the beginning. Although MDN is used as a mechanism for a response message, the same e-mail transmission method is employed if DSN is used instead.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication control method for an electronic mail system comprising a plurality of electronic mail devices, wherein an electronic mail device to serve as a sender adds identification information according to a standard e-mail format to an e-mail, attaches an image of specific conditions by a standard of an Internet facsimile to the e-mail and transmits the e-mail;

when identifying the identification information in the received e-mail, an electronic mail device to serve as a receiver adds identification information and local capability information to an e-mail to be returned to the sender and returns the e-mail;

when identifying the identification information in the received e-mail, the electronic mail device to serve as a sender acquires the capability information from the received e-mail, attaches an image matched with the acquired capability information to an e-mail to be retuned to the receiver and returns the e-mail; and the electronic mail device to serve as a receiver processes the image attached to the received e-mail.

2. The communication control method according to claim 1, wherein the identification information is described in a sequence of characters in a user defined field of the standard e-mail format provided in a header of the e-mail.

3. A communication control method for an electronic mail system comprising a plurality of electronic mail devices, wherein an electronic mail device to serve as a sender adds first identification information to an e-mail, attaches an image of specific conditions to the e-mail and transmits the e-mail;

when identifying the first identification information in the received email, an electronic mail device to serve as a receiver adds second identification information and local capability information to an e-mail to be returned to the sender and returns the e-mail;

when identifying the second identification information in the received e-mail, the electronic mail device to serve as a sender acquires the capability information from the e-mail, adds third identification information to an e-mail to be returned to the receiver, attaches an image matched with the acquired capability information to the e-mail and returns the e-mail; and when identifying the third identification information in the received email received, the electronic mail device to serve as a receiver processes the image attached to the received e-mail.

4. The communication control method according to claim 3, wherein each of the first, second and third identification information is described in a sequence of characters in a user defined field provided in a header of the e-mail.

5. The communication control method according to claim 3, wherein the first identification information is capability request information, the second identification information is capability response information, and the third identification information is image-attached information.

6. The communication control method according to claim 3, wherein the first identification information is information informing a local control method and capability request information, the second identification information is information informing a local control method and capability response information, and the third identification information is information informing a local control method and image-attached information.

7. The communication control method according to claim 3, wherein the first identification information is information informing a local control method, the second identification information is information informing a local control method and capability response information, and the third identification information is information informing a local control method and image-attached information.

8. A communication control method for an electronic mail system for transmitting an image in an e-mail, wherein when the image is to be transmitted to a receiver whose capability is unknown in a form of e-mail via an Internet, identification information is written in a header of the e-mail according to a standard format of the email, and an image of specific conditions defined by a standard specification of an internet facsimile device to the e-mail, which is then transmitted to the receiver.

9. A communication control method for an electronic mail system comprising a plurality of electronic mail devices, wherein an electronic mail device to serve as a sender forms an image file by converting an image of specific conditions defined by a standard specification of an internet facsimile device, writes identification information in a comment field present in a format of the image file, attaches the image file containing the identification information to an e-mail and transmits the e-mail to a receiver;

when identifying the identification information present in the image file attached to the received e-mail, an electronic mail device to serve as a receiver adds the identification information and local capability information to an e-mail to be returned to the sender and returns the e-mail;

when identifying the identification information in the e-mail retuned, the electronic mail device to serve as the sender acquires the capability information from the returned e-mail, attaches an image matched with the acquired capability information to an e-mail to be returned to the receiver and returns the e-mail; and the electronic mail device to serve as the receiver processes the image attached to the received e-mail.

10. A communication control method for an electronic mail system comprising a plurality of electronic mail devices, wherein an electronic mail device to serve a sender, forms an image file by converting an image of specific conditions defined by a standard specification of an internet facsimile device, writes first identification information in a comment field present in a format of the image file, attaches the image file containing the first identification information to an e-mail to be transmitted and transmits the e-mail to a sender;

when identifying the first identification information present in the image file attached to the received e-mail, an electronic mail device to serve as the receiver adds second identification information and local capability information to an e-mail to be returned to the sender and returns the e-mail;

when identifying the second identification information in the returned e-mail, the electronic mail device to serve as the sender acquires the local capability information from that e-mail, attaches an image matched with the acquired capability information to an e-mail to be returned to the receiver and returns the e-mail; and the electronic mail device to serve as the receiver processes the image attached to the received e-mail.

11. The communication control method according to claim 10, wherein the first identification information is a sequence of characters indicating a capability request described in a comment field present in a format of the image file and the second identification information is a sequence of characters indicating a capability response described in a returned e-mail in accordance with a standard e-mail format.

12. A communication control method for an electronic mail device for transmitting an image in an e-mail, wherein when the image is to be transmitted to a receiver whose capability is unknown in an e-mail format via an Internet, an electronic mail device to serve as a sender forms an image file of specific conditions defined by a standard specification of an internet facsimile device, writes a sequence of characters indicating a capability request in a comment field in a format of the image file, attaches the image file to an e-mail to be transmitted and transmits the e-mail to the receiver.

13. An e-mail device for transmitting and receiving an image by an e-mail via an Internet, comprising:

a first image forming unit configured to form a first image under specific conditions defined by a standard specification of an internet facsimile device;

a second image forming unit configured to form a second image that matches with local capability information of an e-mail device to serve as a receiver;

an identification information adding unit configured to add identification information including first, second or third identification information to an e-mail in accordance with a standard e-mail format; and a transmitting unit configured to transmit the first or second image in an e-mail format;

wherein the transmitting unit attaches the first image to the e-mail to which the first identification information has been added by the identification information adding unit, and transmits the e-mail to the receiver.

14. The e-mail device according to claim 13, further comprising:

a receiving unit configured to receive an e-mail;

an identification unit configured to identify the identification information added to the e-mail received by the receiving unit; and a capability information adding unit configured to add local capability information to the e-mail;

wherein when the first identification information is identified by the identification unit, the identification information adding unit adds the second identification information to the e-mail, the capability information adding unit adds the local capability information to the e-mail, and the transmitting unit transmits the e-mail.

15. The e-mail device according to claim 14, further comprising:

a capability information acquiring unit configured to acquire the capability information attached to the received e-mail, when the identification unit identifies the second identification information attached to the e-mail received by the receiving unit;

an image acquiring unit configured to acquire the second image attached to the received e-mail, when the identification unit identifies the third identification information attached to the e-mail received by the receiving unit; and a processing unit configured to process the second image, wherein when the second identification information is identified by the identification unit, the identification information adding unit attaches the second image to the e-mail to which the third identification information has been added by the identification information adding unit, and the transmitting unit transmits the e-mail.

16. An e-mail device for transmitting and receiving an image by an e-mail via an Internet, comprising:

a first image forming unit configured to form a first image under specific conditions defined by a standard specification of an internet facsimile device;

a second image forming unit configured to form a second image that matches with local capability information of an e-mail device to serve as a receiver, an identification information adding unit configured to add first identification information to an image file obtained by converting the first image into an e-mail format, or add second identification information to an e-mail in accordance with a standard email format; and a transmitting unit configured to transmit the first or second image in an e-mail format;

wherein the transmitting unit attaches the first image to the e-mail to which the first identification information has been added by the identification information adding unit, and transmits the e-mail to the receiver.

17. The e-mail device according to claim 16, further comprising:

a receiving unit configured to receive an e-mail;

an identification unit configured to identify the identification information added to the e-mail received by the receiving unit; and a capability information adding unit configured to add local capability information to the e-mail;

wherein when the first identification information is identified by the identification unit, the identification information adding unit adds the second identification information to the e-mail, the capability information adding unit adds the local capability information to the e-mail, and the transmitting unit transmits the e-mail.

18. The e-mail device according to claim 17, further comprising:

a capability information acquiring unit configured to acquire the capability information attached to the received e-mail, when the identification unit identifies the second identification information attached to the e-mail received by the receiving unit;

an image acquiring unit configured to acquire the second image attached to the e-mail received; and a processing unit configured to process the second image;

wherein when the second identification information is identified by the identification unit, the transmitting unit attaches the second image to the e-mail to be returned, and returns the e-mail.

* * * * *